United States Patent
Minami et al.

(10) Patent No.: US 9,314,709 B2
(45) Date of Patent: Apr. 19, 2016

(54) STRUCTURED PACKING FOR GAS-LIQUID MASS TRANSFER UNIT

(75) Inventors: Ichiro Minami, Tokyo (JP); Masajiro Sakurai, Yokosuka (JP); Yasuo Suzuki, Chigasaki (JP)

(73) Assignee: GTC Technology US LLC, Houston, TX (US)

( * ) Notice: Subject to any disclaimer, the term of this patent is extended or adjusted under 35 U.S.C. 154(b) by 211 days.

(21) Appl. No.: 13/819,923

(22) PCT Filed: Sep. 1, 2011

(86) PCT No.: PCT/IB2011/002695
§ 371 (c)(1),
(2), (4) Date: Jun. 7, 2013

(87) PCT Pub. No.: WO2012/028960
PCT Pub. Date: Mar. 8, 2012

(65) Prior Publication Data
US 2014/0103550 A1 Apr. 17, 2014

(30) Foreign Application Priority Data
Sep. 2, 2010 (JP) ................................. 2010-210050

(51) Int. Cl.
*B01F 3/04* (2006.01)
*B01D 3/32* (2006.01)
*B01J 19/32* (2006.01)

(52) U.S. Cl.
CPC .............. *B01D 3/32* (2013.01); *B01F 3/04078* (2013.01); *B01J 19/32* (2013.01);
(Continued)

(58) Field of Classification Search
CPC .......... B01F 3/04; B01F 3/04078; B01D 3/00
USPC .................................... 261/112.1, 112.2, 113
See application file for complete search history.

(56) References Cited

U.S. PATENT DOCUMENTS

| 3,959,419 A | 5/1976 | Kitterman |
| 4,107,241 A | 8/1978 | Braun |

(Continued)

FOREIGN PATENT DOCUMENTS

| EP | 0158917 A2 | 10/1985 |
| EP | 0733402 A1 | 9/1996 |

(Continued)

OTHER PUBLICATIONS

Kister, Henry Z., "Distillation Design," McGraw-Hill, 1992.
(Continued)

*Primary Examiner* — Robert A Hopkins
(74) *Attorney, Agent, or Firm* — Winstead PC

(57) ABSTRACT

In existing structured packing, performance depends on effective contacting area. Performance decreases in cases having high surface tensions such mixtures containing a lot of water. Such mixtures are difficult to wet the packing surface. The present invention prevents liquid from intersecting the crease of the corrugation and from falling into a free space. Further, liquid flowing into the slot makes frequent liquid and vapor interfacial update resulting in positive utilization of the wetted area. The most important point of this invention is taking a positive utilization of the wetted area. The most important point of this invention is taking a large value of 3.5 or more of P/H (pitch/height of the crimp) and providing the horizontal slot on the crease, resulting in adding the flow reversal mechanism and frequent interfacial update.

9 Claims, 4 Drawing Sheets

(52) U.S. Cl.
CPC ............ *B01J 2219/3221* (2013.01); *B01J 2219/32213* (2013.01); *B01J 2219/32227* (2013.01); *B01J 2219/32268* (2013.01); *B01J 2219/32272* (2013.01); *B01J 2219/32408* (2013.01)

(56) References Cited

U.S. PATENT DOCUMENTS

| | | |
|---|---|---|
| 4,256,673 A | 3/1981 | Braun |
| 4,275,018 A | 6/1981 | Braun |
| 4,337,217 A | 6/1982 | Braun |
| 4,519,960 A | 5/1985 | Kitterman et al. |
| 4,597,916 A | 7/1986 | Chen |
| 4,603,022 A | 7/1986 | Yoneda et al. |
| 4,604,247 A | 8/1986 | Chen et al. |
| 4,643,853 A | 2/1987 | Braun |
| 4,710,326 A | 12/1987 | Seah |
| 4,729,857 A | 3/1988 | Lee et al. |
| 4,842,778 A | 6/1989 | Chen et al. |
| 5,185,106 A * | 2/1993 | Chen et al. ............ 261/112.2 |
| 5,632,933 A | 5/1997 | Yeoman et al. |
| 5,882,772 A | 3/1999 | Schultes |
| 5,885,694 A | 3/1999 | Schultes |
| 5,921,109 A | 7/1999 | Billingham et al. |
| 6,293,526 B1 | 9/2001 | Fischer et al. |
| 6,588,736 B1 | 7/2003 | Chuang et al. |
| 6,722,639 B2 | 4/2004 | Ender et al. |
| 6,799,752 B2 | 10/2004 | Wu et al. |
| 2007/0295591 A1 | 12/2007 | Mosler |
| 2008/0245651 A1 | 10/2008 | Werlen et al. |
| 2012/0134886 A1 | 5/2012 | Schultes et al. |

FOREIGN PATENT DOCUMENTS

| | | |
|---|---|---|
| EP | 0761303 A2 | 3/1997 |
| EP | 0764462 A2 | 3/1997 |

OTHER PUBLICATIONS

Yano, Akira, "A Recent Trend of the Distillation Apparatus and the Packing for the Distillation Column," Petrotech, vol. 13, No. 13, p. 55, Mar. 1990.

Schultes, M., Chambers, S., Reaching New Performance Levels with Surface Enhanced Raschig Super-Pak Structured Packings, American Institute of Chemical Engineers, Proceedings of the 2007 Spring Meeting & 3rd Global Conference on Process Safety.

Young, Lee W., "International Search Report" prepared for PCT/IB2011/002695 as mailed Apr. 17, 2012.

* cited by examiner

STRUCTURED PACKING FOR GAS-LIQUID MASS TRANSFER UNIT

TECHNICAL FIELD

This invention is concerning the packing for the purpose of contacting liquid with vapor and promoting mass and heat transfer between both fluids in the chemical process plant. The packing for liquid and vapor to effectively contact is installed on the distillation column, absorption tower, cooling tower and those kind of devices, and both fluids contact each other on the surface or the inside of each packing or outside spaces of packing. Though the packing is used to mainly promote mass and heat transfer between liquid and vapor in general, the chemical reaction might be accompanied at the same time in this process. Distillation is used most frequently among the unit operations to separate a product component from a feeding mixture in chemical plant. In addition, this kind of packings that promote mass and heat transfer is the key internals as well as the tray in the distillation unit.

BACKGROUND OF THE INVENTION

The packing is divided roughly into two groups (random packing and structured packing). Since the shape of random packing is a specific geometrical discrete pieces, it is randomly dumped and installed in the column. Meanwhile structured packing is regularly crimped layers of wire or metal or plastic sheets. Those sheets are composed of waved zonal laminas. Section of structured packing are stacked into the column. This invention claims the specific corrugated structured packing made of waved zonal laminas.

Liquid is charged to the upper part of such packing layers in the column and falls by gravity force, on the contrary vapor is charged from the lower parts of packing layer in the column and rises by pressure force. In this cycle mass and heat transfer between both fluids is promoted by counter current contact of both fluids on the packing layer. Liquid flows down uniformly on the packing layer as a dispersed phase, though vapor rises on the packing layer as a continuous phase. If liquid does not disperse uniformly, transfer efficiency decreases. In addition channeling, that means maldistribution of liquid flow, reduces transfer efficiency remarkably since contact of both fluids is extremely limited.

Liquid must be charged to the top of packing layer and dispersed as the liquid droplet in order to flow down uniformly. High performance liquid distributors are, of course, wanted, but they can not control the behavior of the liquid within the layer.

Performance (including shape) of the packing is the key factor that influences liquid behavior because liquid descends along the packing layer and it comes to a conclusion that packing performance definitely determines transfer efficiency of the unit. Liquid from distributor flows on the waved surface of each packing element, and inside & outside space of the element and repeats the current contact with rising vapor in the packing layer. Main path of rising gas is the inclining ditched space that is surrounded with the waved packing element. A considerable part of the vapor that rises diagonally in ditched space, intersects the crease of the elements, then moves to ditched space on the waved surface side of the adjacent element that intersects the previous direction. Vapor rises along zigzag path in the packing layer like this. Other than the above main path, vapor rises through the opening holes on the packing surface.

If passing of vapor through the opening hole can induce turbulence of liquid, mass transfer around near liquid interface will be enhanced. On that reason many existing structured packing have an opening holes on the waved surface. The role of the opening is not only to promote the mass transfer as mentioned, but also for liquid to easily enter to the back side of waved surface and to spread widely on the waved surface by detour of opening holes. That is the reason why the opening on the surface has a great effect on liquid flow pattern.

PATENT DOCUMENTS

U.S. Pat. No. 4,710,326

In description of preferred embodiments, the interior angle of the fold forming a corrugation is recommended to be less than 90 degrees, and about 60 degrees is suggested. As for the interior angle of 60 degrees, the value of P/H (later will be defined) corresponds to 1.15. It seems to be the minimum value of P/H among disclosed or existing packing. Moreover, the relation between P/H and the slot is not referred.

Literature Other Than Patent

2007 Spring AIChE Meeting 'REACHING NEW PERFORMANCE LEVELS WITH SURFACE ENHANCED RASCHING SUPER-PAK STRUCTURED PACKINGS'

According to the attached photos, the direction of slot is diagonal not horizontal. Moreover structural details of other information such as P/H etc. are uncertain.

Literature Other Than Patent

HENRY Z. Kister, 'DISTILLATION DESIGN', McGraw-Hill, Inc.

It is described that P/H of the structured packing are from 2 to 4. The slot is not described.

Literature Other Than Patent

Yano akira, 'A RECENT TREND OF THE DISTILLATION APPARATUS AND THE PACKING FOR THE DISTILLATION COLUMN', PETROTECH, 1990, MARCH, 13th vol. No. 13, p 55.

According to the above chapter, PIH of the existing structured packing is around 2, and holes of 3.8 mm in diameter are used on the surface of corrugated sheets.

OUTLINE OF INVENTION

Problem to be Solved

In the existing structured packing, mass transfer between liquid and vapor is promoted by wetted surface area, not re-coalesce of liquid droplet since there are few liquid droplet. That is, performance of the existing structured packing depends on effective contacting area. In large surface tension system such as including a lot of water, it is difficult for surface of packing to be well wetted and for effective wetted area to be kept. Therefore, the existing structured packing can not perform well in the large surface tension. In order to understand the behavior of liquid flow in the existing structured packing, this inventors executed a systematic fluid flow experiment concerning the rate of liquid that moved to the back surface through the opening holes on the waved surface. As a result the rate to back surface was extremely limited and the majority of liquids detoured around the opening and fell.

Since the waved surface inclines not only in the diagonally downward direction of the crease but also in the direction of traversing the waved surface, the part of falling liquid that detours the opening does not always keep staying on the same surface and intersects the crease before long. Once liquid leaves the inclined surface and falls near the crease, liquid tends to continue falling near the crease and hardly return to the inclined waved surface.

As the result of flow experiment of the existing structured packing, the rate of bypassing liquid that intersects the crease and falls nearly straightforward is more than imagined. One reason is that major part of liquid does not flow into the openings, but detours the openings and intersects the crease. Such bypassing is called channeling that directly reduces contacting interfacial area and efficiency. The experiment showed that performance of the existing packing would increase if channeling were protected. In details the existing packing encounters low efficiency against relatively high liquid load, especially in high pressure service where liquid relative volumetric load becomes higher compared with in low pressure condition since vapor volumetric load goes smaller by pressurization.

In addition, higher liquid load is apt to choke the opening holes on the waved surface and has smaller wetted area per liquid load since wetted area is constant in the existing packing. With flow experiment using visible apparatus, several kind of packing and air-water and air-hydrocarbon fluids, this inventors observed that detouring liquid around the opening holes flows relatively calm and smooth. If liquid enters the opening holes, mass transfer is promoted and generation of liquid droplet accelerates this tendency.

In the experiment, the diameter of circular opening was changed for the purpose of the observation of liquid flow pattern on the several types of corrugated structured packing that is made of metal sheet 0.1 mm in thickness. The waved angle of gradient was 45 degrees and specific surface area was 250 m2/m3 in this experiment that made match with the popular existing structured packing. Generally, when the opening area was small, the tendency that the opening was covered with the liquid thin film, and the flowing liquid jumped over this part, was observed. In this case, the rate of liquid that moved to the back side of waved surface and bypassed the opening was extremely low. For higher liquid loads even the circular opening (=hole) of about 4 mm in diameter in the popular existing packing tends to be covered with the liquid film as well as the smaller holes. Liquid film phenomenon in this opening is considered to be one cause of the low performance. When liquid load was lowered up to the range usually industrially operated, the opening was not covered with the liquid film. However in this case extremely low liquid load flows into the opening and many parts of liquid was observed to fall in such a way to detour the opening. It was recognized that the opening has the role for liquid to detour and diffuse horizontally, resulting in increase of wetted area of packing.

It was confirmed that the rate of flowing liquid into the backside of opening is higher as the hole diameter becomes extremely larger and these rate greatly depends on the opening area. The rate of falling liquid that intersected the crease did not always decrease in case when both hole diameter and the rate of inflowing liquid increased. This is considered because the increase of the opening area promotes the horizontal diffusion of liquid.

Moreover, since liquid load that detoured to the waved surface on the same table as liquid flow in the downstream following the lower semicircle opening decreased with an increase of the opening area, the opening area was not wetted by liquid and became a dry condition.

It was clarified also that there was a limit in attempting the improvement of the waved structured packing by enlarging an opening area due to such reason. Moreover, the waste amount of the material increases as the opening space increases, resulting in the excessive need of material. With an increase of the inflowing liquid to the opening, liquid not only moves to the backside of the waved surface, but also are apt to fall to another waved surface located further below through the space. In such process that flow pattern changes, the possibility of liquid dispersion increases. If liquid disperses into liquid droplet, they joined each other and re-coalesce occurs. Such frequent dispersion and re-coalesce of liquid droplet makes repeated interfacial update and promotes mass transfer. Liquid load that flows to the circular opening (about 4 mm in diameter) adopted to the large part of the existing structured packing, is limited and the problem is how to increase liquid load.

Means of Solving the Problems

The existing packing has not been able to perform well in separating components with large surface tension that is greatly influenced by the wetness on the surface of the packing. Moreover, the existing packing has been rarely used for such a unit because of remarkable low performance in distillation using relatively higher liquid load as those under high-pressure condition. Experiment showed the following cause of poor performance in high liquid load:

(1) The rate of liquid that intersects the crease of waved surfaces increases.

(2) Liquid tends to cover the opening.

(3) Effective transfer area per liquid rate don't increase with liquid load.

However, it is difficult to increase contacting area in proportion to an increase of liquid load. The decrease of contacting area can be compensated by the dispersion and re-coalesce of liquid droplet. That is, promotion of mass transfer through frequent interfacial update can make amends for decreasing relative contacting area.

Since dispersion and re-coalesce of liquid droplet can be promoted as flowing rate of liquid in the opening increases, contrivance of how to positively introduce liquid to the opening is needed. When the distance of between a peak and an adjacent peaks, or a trough and an adjacent trough is defined as pitch (P) and the distance of between a peak and an adjacent trough is defined as height (H), P/H of the existing packing is the small value of such as roughly 2.0 to 2.5. Oppositely in the packing of this invention extremely large value of P/H is used to solve several problem as mentioned. However, such large P/H has been pointed out to have defects to decrease transfer efficiency rapidly as liquid load increases. This inventors observed the relation of P/H (from 2 to 5) and liquid load intersecting the waved surface, overflows the lower crease and finally falls to a free space.

When the value of P/H is 3.0 or more, the rate of free-falling liquid increased more rapidly, compared with in the range of 2.5 or less. At 3.5 or more and near about 4.0 of P/H value, the rate of free-falling liquid extremely increased.

This inventors tried to reverse the direction of the liquid flow intersecting the crease of the waved surface before the liquid intersected. If the direction of liquid flow can be reversed, liquid can be prevented from intersecting the crease and falling to a free space. If this becomes possible, the structured packing can be used regardless of the P/H value. This inventors arranged many openings at the top and bottom of waved sheets along the crease as a method of reversing the flow direction.

Major parts of liquid that flows in the opening, can fall to another lower waved sheets through the opening.

Since the intersecting direction of another waved surface to which liquid falls is inverse to the of present direction of waved sheets, flowing liquid turns over.

Thus, it becomes possible for liquid to intersect the wave surface repeatedly. In this invention high load liquid are apt to intersect the waved surface because the value of P/H is extremely larger than the existing waved surface. On the other hand, in the existing packing the rate of flowing liquid diagonally downward on the waved surface is large since P/H is a comparatively small value. As mentioned, the value of P/H affects the flow pattern on such the waved surface. If the rate of liquid falling diagonally on the waved surface increases, liquid falls rapidly since velocity is accelerated because of one-sided direction. In addition, since the liquid flow that slowly intersects the waved surface decreases, liquid doesn't diffuse enough on the waved surface, and the contacting area decreases. On the other hand in this invention with large value of P/H, there is an effect of wetting the waved surface in the downstream of the opening from horizontal direction because the liquid flows diagonally from the horizontal direction and is easy to enter the opening. The most important point of this invention is for liquid to frequently intersect the crease of the waved surface with large value of P/H and to have the reversal mechanism to prevent liquid flow from overflowing the crease of the waved surface. Liquid volumetric load relatively increases as vapor density increases under high pressure condition. When liquid load increases in the existing packing, owing to increase of liquid height and hydraulic resistance liquid tends to intersect the crease and fall to a free space and relative contacting interfacial area per liquid decreases. However in case of this invention liquid tends to flow into the opening and avoid falling to a free space at higher load. The mass transfer mechanism of this invention depends not only on the contacting area (the same as the existing packing), but also on dispersion and re-coalesce of liquid droplet in the case when liquid passes the opening. Therefore, in this invention, interfacial update between liquid and vapor that is promoted by increasing liquid load to the opening, can compensate the decrease of relative wetted area. According to the above-mentioned experiment, the liquid rate flowing in the round opening is increasing as the area increases. Then, this inventors experimented on shape in the opening of the square the title line of which is diagonally straight in place of the circle. In this case liquid tends to fall along the inclined cut as is the case of the round opening and increasing tendency of the rate of liquid is confirmed as the angle of this straight cut is horizontally brought close to horizontal level.

Liquid that flows into the horizontal cut hardly goes to one direction alone different from into the inclined cut or the circle. Therefore, liquid is apt to extend to both right and left sides of the cut equally. Such horizontal movement is not accelerated by gravity, and the velocity that extends to side direction becomes slow compared with the case of the inclined cut. Liquid accumulates and liquid head becomes high if the liquid flows continuously into the part of horizontal cut. The liquid moves to both sides of the cut to be in the liquid thin film form because gravity works as leveling action to the liquid volume. The liquid tends to diffuse horizontally along with the horizontal upper line of the cut. The liquid thin film will increase the thickness before long, and it falls to an open mouth space that is surrounded by the lower line of the cut. The extent of liquid falling from the cut depends on the balance between working gravity and surface tension. Liquid falls when the gravity force of increasing liquid load overcomes surface tension to maintain liquid. This phenomenon becomes intermittent, not continuous, and therefore liquid becomes droplet and tends to fall. In the opening with the horizontal upper line, liquid can easily flow in and diffuse horizontally and pass the waved surface as droplet. In the round opening used in the existing packing, the rate of liquid flowing in the opening is limited, and major parts of liquid tends to detour the opening. The above-mentioned finding by the flow experiment concluded that upper line of cut is horizontal or near so in shape different from the existing packing. Liquid flowing in the opening with the horizontal upper cut passes the below open mouth space as droplet. While parts of flowing liquid are adhering to the back side of the opening, the majority falls to another waved surface below. The fallen liquid joins other liquids and this assembly forms the liquid thin film on this waved surface. Through such repetition, dispersion to the liquid droplet and the re-coalescence to the liquid thin film frequently happen. The interface between liquid and vapor is frequently updated by dispersion and re-coalescence in the packing of this invention. The composition difference (that is driving force of mass transfer) between liquid and vapor occurs when interface is updated by new fluids. Frequent dispersion and re-coalesce of liquid droplet is convenient for promoting mass transfer and the shape of the opening used in this invention offers the desirable flow characteristic.

Moreover, because the inflow of the liquid to the opening easily falls diagonally from the horizontal direction of the waved surface, it can wet the waved surface in the downstream of the opening from horizontal direction. This is a result of enlarging the value of P/H as already described. In this invention the downstream of the opening comes not to be dried up because of many openings installed along the waved surface and of horizontal flow direction owing to large P/H. As for the cut direction to consist the slots on the surface, it is most preferable to be the horizontal. However, performance doesn't always decrease extremely so long as it is near horizontal. It is not allowed that upper line of the cut inclines rapidly downward even if it is a little part. Since a lot of liquid falls from the opening where the cut is rapidly changed, the diffusion of the liquid to horizontal direction is intercepted. Shape of the opening described in the claim is that such a qualitative fact was materialized. Further details are determined after the distillation experiment with actual fluid was performed using the actual packing based on the finding of the flow experiment.

Advantageous Effect of the Invention

In the existing structured packing, wetted area plays an chief role in promotion of mass transfer and keeping an enough wetted area become difficult for large surface tension (hard to be wetted) system such as with a large amount of water. In this invention, besides wetted area, mass transfer is accelerated by frequent interfacial update. Since the dependence of mass transfer on wetted area is limited in the packing of this invention, it can be used regardless of the range of surface tension.

As for the packing of this invention, many regular opening are arranged with the horizontal slots and tabs on the waved surface. Liquid in the waved surface is easy to flow in the slots in this packing, and diffuses to horizontal direction around the upper line of slot, and tends to fall as droplet in dispersion phase.

Different from the existing packing, mass transfer becomes more effective as falling liquid joins other liquids in new surface and dispersion and re-coalescence of liquid droplet are repeated for liquid and vapor interface to be frequently updated. The existing packing has been hardly used for high liquid load system under high pressure condition since both wetted area per liquid and mass transfer efficiency decrease.

The structured packing of this invention can be applicable for higher liquid load since the effect of wetted area is relatively small and mass transfer increases.

In the existing structured packing, it turned out that high liquid load intersecting the crease are easy to fall to a free space and difficult to return to the waved surface. For even not high liquid load, since liquid is apt to fall diagonally, liquid is likely to be gathered to the column wall and to continue flowing near the wall. This means bypassing of the waved sheets and channeling.

The structured packing of this invention solves the above problems and minimizes channeling by not overflowing the crease, but flowing into horizontal slots.

Distributor becomes unnecessary or minimum though re-distributor per each specified height is necessary to avoid channeling in the existing packing. The packing of this invention turned out that the separation efficiency improved with an increase of liquid according to the actual distillation experiment over the wide range with actual fluids. This shows that frequent dispersion and re-coalesces of liquid droplet promotes an interfacial update with an increase of liquid load. Generally in the existing packing the separation efficiency decreases with an increase of liquid load.

In higher liquid load this decrease seems to be caused from that (1) effective wetted area per liquid decreases and that (2) a kind of channeling becomes remarkable. Regarding capacity in liquid-vapor refining unit such as distillation column, the flooding point is an operational upper limit. In the existing structured packing, the separation efficiency decreases as liquid load increases. Therefore, the separation efficiency might fall under the specified value before flooding is encountered. The maximum throughput for this case is determined by not the flooding point, but the allowable lower limit of efficiency. In the packing of this invention, wide operational range becomes possible since separation efficiency improves with increase of liquid load to flooding point.

In such a liquid and vapor contacting operation, the working unit that arranges a lot of trays from top to bottom in cylindrical column ① as generally called a tray tower.

In tray tower tray ② holds the descending liquid from the upper tray and to which ascending vapor from the lower tray is entered, and on which both liquid and vapor are contacted.

Figure 1:
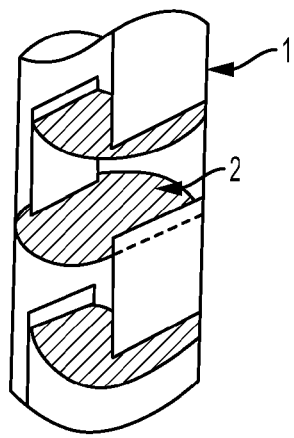
[FIG. 1] Explanation Concerning Drawing of Tray Tower
Figure 2:
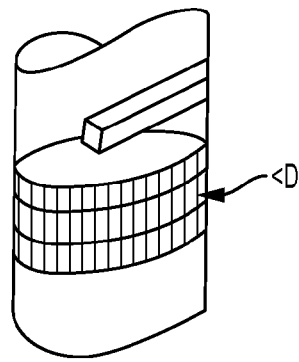

[FIG. 2] Explanation Concerning Drawing of Packing Tower

In the packing tower, mass transfer is performed through contact between the descending liquid and ascending vapor in packing ① layers installed in cylindrical column. Since the packing tower has the merit of better performance of mass and heat transfer and lower pressure loss compared with tray tower, the packing has come to be used in place of the tray in accordance with the object.

Figure 3:
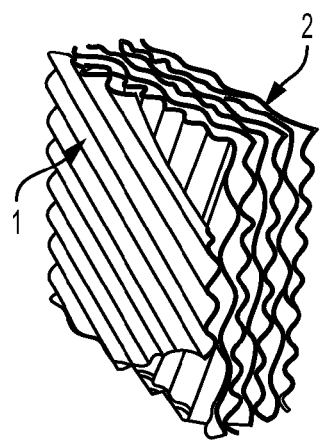

[FIG. 3] Structure of the Corrugated Structured Packing

In large majority of structured packing including the metallic lamina and the wire net, etc., a lot of round openings are arranged in the plane of a zonal material beforehand, and formed and manufactured as the inclined shape of waves ①, ② in the long direction that bends to an alternate inside and outside at a regular interval and the angle. Many pieces of the corrugated sheets are made by cutting the waved lamina material obtained thus. These prescribed number of sheets is piled as the multi-layers. At the same time the packing in the block form is constructed such that they are united for inclination of the adjacent waves of the element to be mutually intersected. In general, the packing layer is formed such that the packing of the block form is piled up to multi-layers vertically in the column. The waved surface of each element that composes the packing layer is arranged so that the wide direction of elements vertical in the column. (①, ②)

Figure 4:
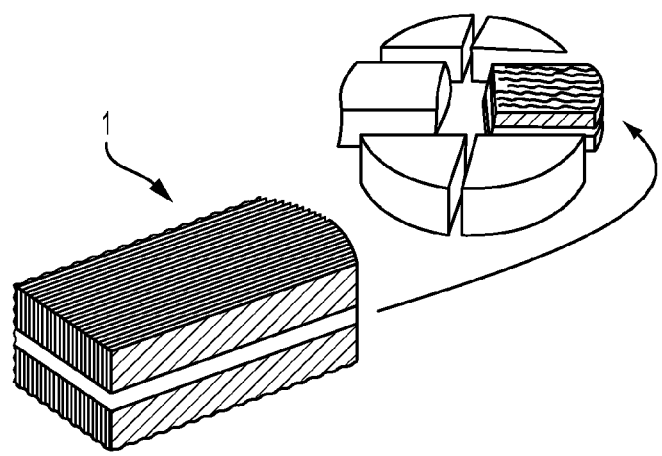

[FIG. 4] Constitution of Packing Layer

The horizontal cross section is a circle in the majority of liquid-vapor contactors including the distillation column, and the packing is provided with the stratified pile form in the tower. First of all, the blocks of packing are installed thoroughly in the horizontal section in the tower. In general, the blocks of packing are paved according to the inside diameter of the tower though the block of 1 piece is used when the inside diameter of the tower is small. When plural blocks are used, blocks of different shape are combined to become a circle in the whole horizontal section. The block of 1 piece or two or more packing element paved over the horizontal cross section in the tower is assumed to be one layer like this, the packing layer is composed that is piled with multi-layer in the vertical direction in the tower(① is a part of ②).

Figure 5:
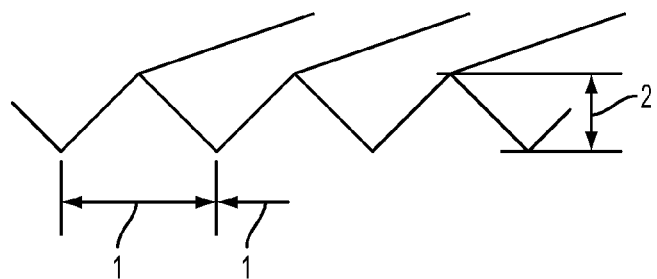

[FIG. 5] Pitch (P) and Height (H) of Packing Element

Horizontal distance (①) of the crimp that is from the top of the crease of the waved surface to adjacent top of the one, or from bottoms of the one to adjacent ones is defined as pitch (P). Vertical distance (②) of the crimp that is from the peak of the crease to the line of troughs or from the trough of the crease to the line of peaks is defined as height (H).

Figure 6:
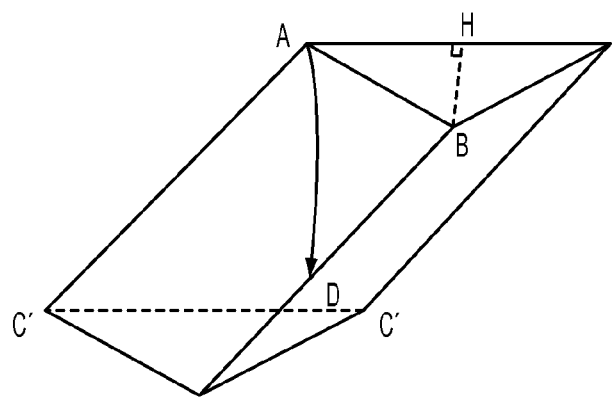

[FIG. 6] Relation Between P/H and Liquid Flow Pattern

Face AA'BB' and face BB'CC' are assumed to show the waved surface connected with both sides of BB' that corresponds to the crease. Triangle ABC is congruent with triangle. A'B'C'. BH is the perpendicular line from top B in triangle ABC, the length of which is the height (=H) of the crimp. Length AC is the pitch (=P) of the crimp.

Virtual plane AA'CC' made of crease AA' and CC' is a perpendicular plane as well as the packing form in the tower. If length (=P) of AC is assumed to be constant and length (=H) of BH is changed, the value of P/H can be changed. Crease AA'BB' and CC' are mutually in parallel. The relation between the movement of the particle and the value of P/H as shown with AD when the particle is put on point A on the table side of waved surface AA'BB' here. A horizontal inclination of this waved surface becomes small and this particle is about to cross the crease BB' in a short time since waved surface AA'BB' approaches plane AA'CC' vertical to BH if the length of BH is reduced. If the length of BH is enlarged oppositely, waved surface AA'BB' goes away from plane AA'CC, and then it takes time to cross the crease. The liquid flows away from the crease BB' and falls the surface near AA' side when the length of BH is enlarged and the value of P/H is reduced further. Liquid load increases that crosses the waved surface and jumps over the crease if oppositely the value of P/H is enlarged and the inclination to horizontal direction is reduced. Liquid flow pattern is determined depending on the value of P/H like this.

Figure 7:
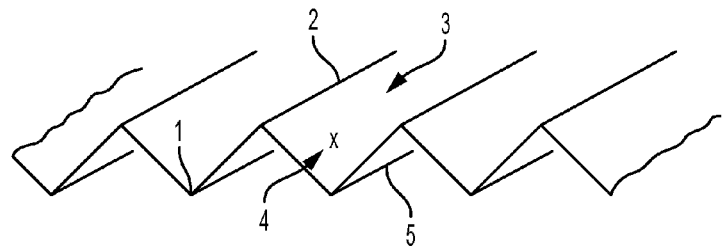

[FIG. 7] Display of Ridge Line

② is a polygonal curve. ③ is the ridge line of peaks and ①, ⑤ are the ridge lines of troughs and ④ is a side parts of the wave.

Figure 8:
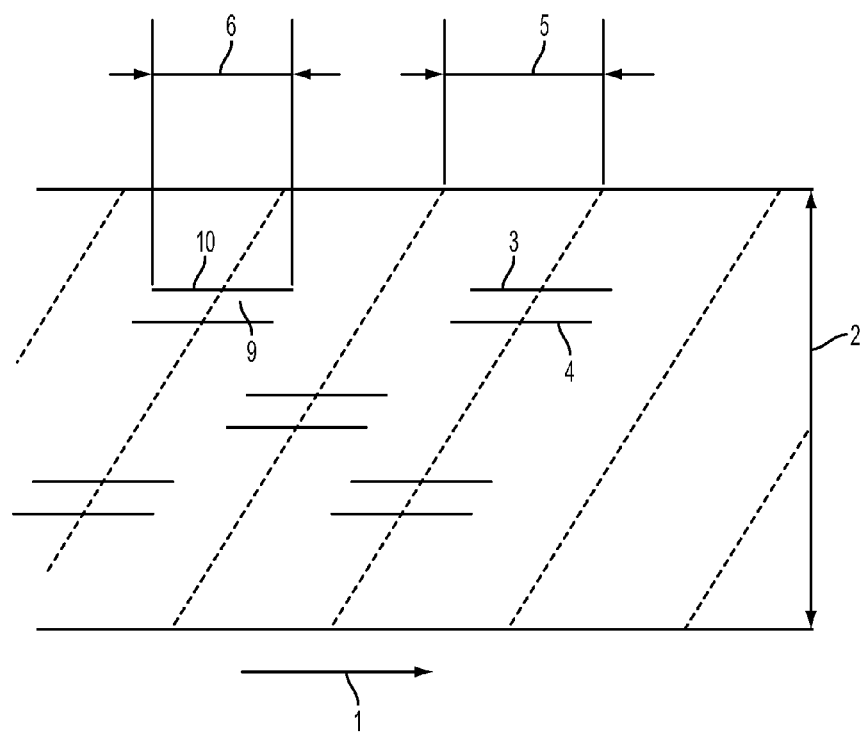

[FIG. 8] General Relation of Slot Dimension

These figures are showing of slots of the limited number to make clear a general relation of slot dimension before fabrication. Planes surrounded with continuous peaks or troughs are defined as element. Two horizontal line intersecting crease is pressed to become the banded opening, that is defined as tab 9 and empty square is defined as slot 10. When horizontal length (6) is assumed to be 'a' and distance from the crease to adjacent crease (5) is assumed to be 'c', a≥0.5 c shall be confirmed. Moreover, d≥3 mm shall be confirmed when the distance in the vertical direction (3) and (4) in the slot is assumed to be 'd'. In addition, FIG. (1) shows the long direction of sheet material and the dotted line exhibits the polygonal curve and the crease (peaks or troughs) of waved surface.

Figure 9:
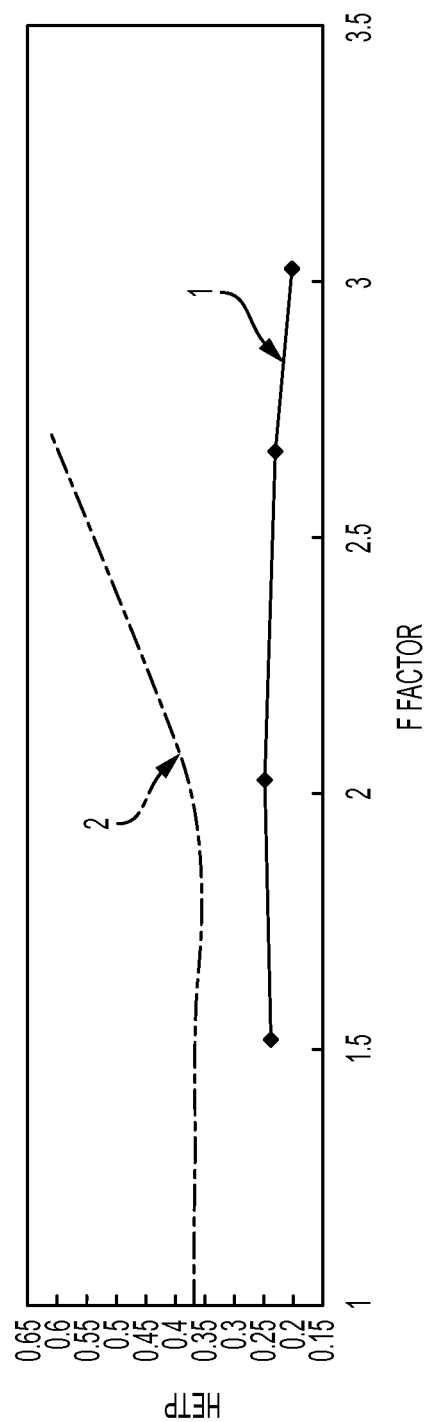

[FIG. 9] Relation of F Factor and HETP

② shows the tendency of the existing structured packing.
① is of this packing and shows the behavior that HETP improves with increase of liquid load, that is different from the existing.

FORM TO PRACTICE INVENTION

P/H is 3.5 or more in the packing of this invention. Moreover, if shape of the upper cut of the slot is near horizontal, the performance of the packing of this invention may be satisfied. However, it is preferable that this cut is the horizontal and straight considering easy manufacturing. Especially, in order to omit the monitoring task when they are assembled to the shape of waves and united like the block, both not only the top but also the bottom of the slot are preferably located side by side by the parallel straight line. Width of horizontal cut of the top and bottom of the slot is described in claim-1. A higher performance can be expected by making it wide as much as mechanical strength permits within this range. As for the liquid, the possibilities of inflowing to the slots becomes larger if this width becomes wider. Interval length (=depth) of upper and lower side of the slots shall be determined according to the design liquid load of the unit. In the packing of this invention, the frequency of interfacial update between liquid and vapor increases and contacting performance improves as liquid flowing to slots becomes frequent. This update can increases as the interval between upper and lower openings approaches. On the other hand, since liquid flows in from upward diagonally to the slot on waved surface, liquid accumulates in front of upper line of the slot and hardly spreads around the upper line if location of slot and the adjacent slot below is too close. If the interval between the slots is narrow as for liquid load, both bridging and liquid jumping of the slot makes performance to decrease. If the interval is wide as for liquid load, reduction of effective area makes performance to decrease, too. Bridging happens even for extremely low liquid load in case when depth of slots is narrow, for example 2 mm etc. It is necessary to avoid 3 mm or less for depth of the slots from the observation of the experiment. The upper depth boundary is not limited and depth from 6 to 10 mm is considered to be passable. But for the range of liquid load used in the existing packing, depth from 4 to 5 mm is desirable.

The existing structured packing often uses emboss fabrication on surface to widely disperse liquid and to increase contacting efficiency, while in the packing of this invention such a surface fabrication is not meaningful since mass and heat transfer mainly depends on not wetted area, but dispersion and re-coalesces of liquid droplet. Though this invention is made clear more concretely hereafter based on the embodiments, this invention is not limited to them.

[Embodiment 1]

Various zonal materials such as metallic lamina, wire net, and board plastic can be used in the packing of this invention as well as the existing so far. The embodiment according to claim-1 is described as follows here.

Material: A stainless metallic lamina of 0.1 mm in thickness

Pitch of element: 48.2 mm and Height of element: 11.6 mm (P/H: 4.2)

Depth of the horizontal upper and lower slot: 4 mm

Specific surface area: 214 m2/m3

Total reflux distillation was performed by using the same as the above-mentioned structured packing under the atmospheric pressure with binary components (water/acetic acid) system. The following operating data were obtained as a result.

|  |  | Run 1 | Run 2 | Run 3 | Run 4 | Run 5 |
|---|---|---|---|---|---|---|
| F factor | m/s (kg/m$^3$)$^{0.5}$ | 1.634 | 1.938 | 2.661 | 2.903 | 3.403 |
| HETP | mm | 479 | 457 | 475 | 479 | 453 |
| Pressure loss | Pa/m | 127 | 185 | 362 | 538 | 859 |

It is an application example to the with large surface tension system including water. The separation performance of this packing was confirmed to be excellent since HETP was found to be 453~479 mm, on the other hand in the existing conventional packing (Specific surface area is 250 m2/m.3), HETP was 600~650 mm.

Different from the existing structured packing, the behavior was observed that HETP of this packing was decreasing with an increase of F factor.

This F factor shows the capacity of the treating gas and defined by the density of vapor multiplied by the square of a vapor superficial velocity in the column and proportional to the capacity of the treating gas.

[Embodiment 2]

The absorption experiment was performed by using the same as embodiment 1 structured packing under the atmospheric pressure in water/acetone/three air components system, and compared with Paul Ring 1-1/2B under the same condition. The following operation data were obtained as a result.

|  |  | This packing | Pall Ring 1-1/2B |
|---|---|---|---|
| Acetone entrance | vol % | 1.824 | 1.827 |
| Acetone exit | vol % | 0.023 | 0.185 |
| HETP | mm | 900 | 1800 |
| UnitPressure loss | Pa/m | 186 | 314 |
| F factor | m/s (kg/m$^3$)$^{0.5}$ | 1.3 | 1.3 |
| liquid rate | m$^3$/m$^2$ h | 55 | 55 |

It is an application for the absorption tower handling high liquid load.

Near half value of HETP and pressure loss were obtained compared with the typical conventional random packing (Paul Ring 1-1/2B).

For reference the existing structured packing showed poor performance for high liquid load, for example over than 30 m$^3$/m$^2$ h.

[Embodiment 3]

Total reflux distillation was performed by using the same as embodiment 1 structured packing in [chloric benzene, ethyl benzene system]. The following operation data were obtained under the atmospheric pressure condition.

|  |  | Run 1 | Run 2 | Run 3 | Run 4 |
|---|---|---|---|---|---|
| F factor | m/s (kg/m³)⁰·⁵ | 1.459 | 2.024 | 2.558 | 2.899 |
| HETP | mm | 249 | 253 | 234 | 205 |
| Unit pressure loss | Pa/m | 186 | 283 | 619 | 1043 |

The separation performance of this packing was confirmed to be excellent since HETP was found to be 205~253 mm, on the other hand in the existing conventional packing (Specific surface area 250 m2/m3), HETP was 300~350 mm.

Similar with the embodiment 1, the behavior was observed that HETP of this packing was decreasing with an increase of F factor.

Moreover, the following operation data were obtained in total reflux distillation at vacuum pressure (100 mmHgA) in the same apparatus and fluids.

|  |  | Run 1 | Run 2 | Run 3 | Run 4 |
|---|---|---|---|---|---|
| F factor | m/s (kg/m³)⁰·⁵ | 2.095 | 2.593 | 3.256 | 3.834 |
| HETP | mm | 246 | 251 | 238 | 202 |
| Unit pressure loss | Pa/m | 192 | 342 | 651 | 1336 |

The tendency that HETP decreases with increase of F factor was observed as well as at atmospheric pressure. High capacity was proven since flooding did not occur even if F factor becomes 3.8 or more.

INDUSTRIAL APPLICABILITY

Unit operation of liquid and vapor separation, representative of which is distillation, is mostly used as well as heat transfer and reaction. As the internals of separation unit, structured packing is spreading in use since it has better efficiency and lower pressure loss compared with tray. But structured packing has the limitation of the treating system and operating range. In this regard the packing of this invention not only has efficiency higher than existing structured packing in usual operating range, but also can be used for large surface tension system and higher liquid load range that were inadequate for the existing structured packing. By applying this invention, economics of total plant unit can improve since the reduction of plant installation cost and energy conservation in itself are expected owing to drastic increase separation efficiency.

The packing of this invention can be replaced for tray by wide application and progress of the economy.

The invention claimed is:

1. A packing system comprising:
   a plurality of sheets, each sheet of the plurality of sheets comprising a first bend and an opposite parallel second bend, the first bend and the opposite parallel second bend defining a waved surface;
   a plurality of slots, each slot of the plurality of slots disposed across at least one of the first bend and the opposite parallel second bend;
   a tab associated with each slot of the plurality of slots, the tab being joined to opposite edges of the slot and being deflected inwardly with respect to the first bend and the opposite parallel second bend; and
   wherein each sheet of the plurality of sheets is arranged in a cross-wise fashion relative to a vertically-adjacent sheet.

2. The packing system of claim 1, wherein:
   the slot comprises a width greater than or equal to 3 mm; and
   the slot comprises an actual length more than 50% of an unfolded length.

3. The packing system of claim 1, wherein the first bend and the opposite parallel second bend are disposed at an angle between approximately 30 degrees and approximately 60 degrees relative to a horizontal plane.

4. The packing system of claim 1, wherein a ratio of pitch to height of the first bend and the opposite parallel second bend is at least 3.5.

5. The packing system of claim 1, comprising a plurality of first bends, the plurality of first bends comprising the first bend.

6. The packing system of claim 5, wherein each first bend of the plurality of first bends is spaced equidistant from a successive first bend.

7. The packing system of claim 1, comprising a plurality of second bends, the plurality of first bends comprising the opposite parallel second bend.

8. The packing system of claim 7, wherein each second bend of the plurality of second bends is spaced equidistant from a successive second bend.

9. The packing system of claim 1, wherein the plurality of slots are of substantially equal length.

* * * * *